Nov. 24, 1959　　　R. W. CRAIG　　　2,914,274
RAILWAY SWITCH POINT CONNECTION
Filed Aug. 22, 1956
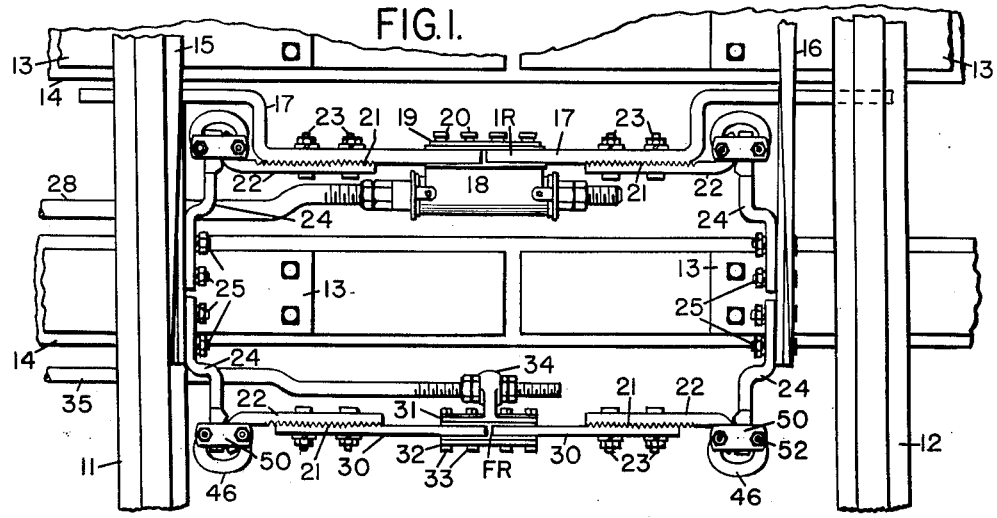
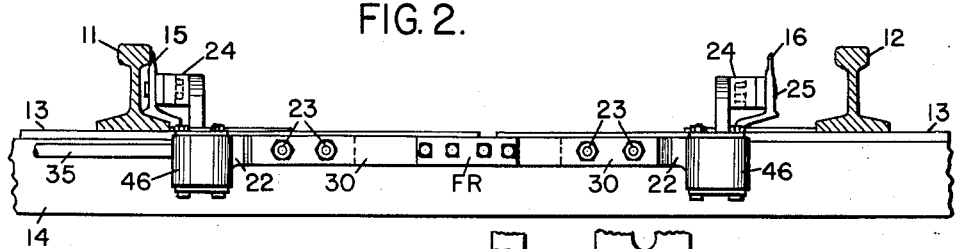
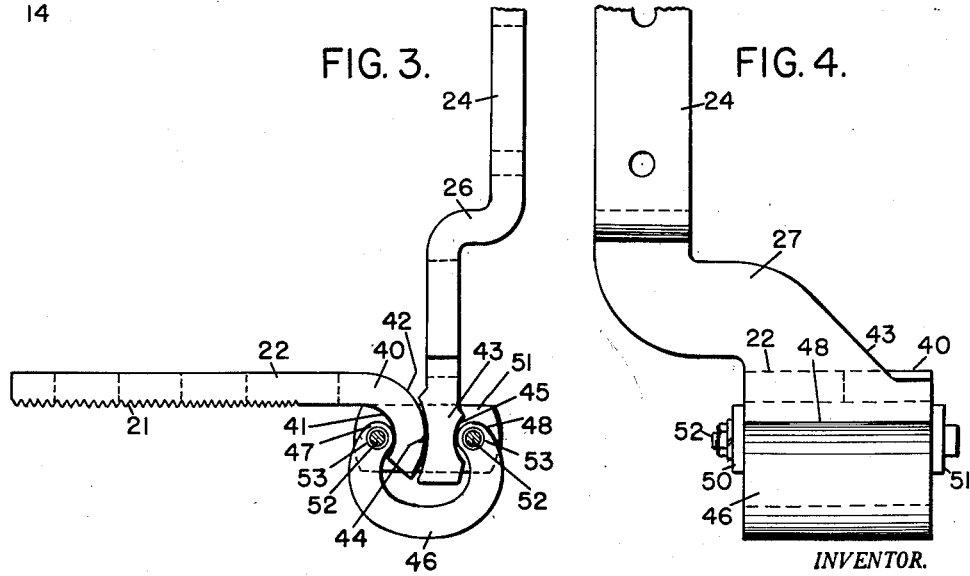
INVENTOR.
R. W. CRAIG
BY
HIS ATTORNEY United States Patent Office 2,914,274
Patented Nov. 24, 1959

2,914,274

RAILWAY SWITCH POINT CONNECTION

Robert W. Craig, Rochester, N.Y., assignor to General Railway Signal Company, Rochester, N.Y.

Application August 22, 1956, Serial No. 605,578

4 Claims. (Cl. 246—449)

This invention relates to railway switch point connections and more particularly pertains to switch point connecting rods and the means for connecting such rods to the switch points.

In connecting throw rods, lock rods and the like to the movable points of a railroad track switch, it is necessary to provide these connections in such a manner so that when operated the switch points will remain rigidly upright and stay down in position on the tie plates and not have a tendency to lift up and roll outwardly when the switch points are pulled up against their adjacent stock rails. Furthermore, as rigid connections invite torsional stresses which cause springing of the switch points and the connecting rods, it is desirable to provide pivotal connections without introducing pins, bushings and bearings which are subject to considerable wear, maintenance, and replacement, as well as expense. The switch point connecting rod comprising the present invention provides all of these features and is durable in use and economical to manufacture as machining is practically eliminated.

Generally speaking, the tie rods and switch lug brackets may be made from bar stock which is forged to provide the necessary bearing surfaces and offsets, after which the bearing surfaces are case hardened to resist wear. The tie rod portions are formed with an arcuate-shaped hook at one end and the switch lug bracket portions have an arcuate-shaped depression on each side at one end. The rods when assembled are positioned at an approximate right angle to each other, and the cooperating arcuate-shaped bearing surfaces form a pivotal joint. A resilient C-shaped clamp is employed to hold the two rods together under bias and a yoke is provided to hold the parts of the assembly in proper alignment.

One object of the present invention is the provision of a switch point connecting rod structure having the desirable pivotal connections to the switch points, yet constructed in such a way that there are no pivot pins, machined bearings, bushings or the like which are subject to considerable wear causing lost motion, extensive maintenance and replacement.

Another object of the present invention is the provision of a pivotal joint for switch point connecting rods wherein the contacting bearing surfaces are held in perfect relationship to each other at all times by a spring biased clamping means, thus automatically taking up any lost motion when assembled due to variations in manufacture and interchangeability of parts.

A still further object of the present invention is the provision of a yoke for holding the various parts and their bearings in proper alignment at all times, said yoke also acting to hold the assembly together in case of a failure of the spring bias clamping means. In this case lost motion would be present but the apparatus would continue to function until repairs could be made.

Other objects, purposes and characteristic features of the present invention will be in part obvious from the accompanying drawings and in part pointed out as the description of the invention progresses.

In describing the invention in detail, reference will be made to the accompanying drawings in which corresponding reference characters designate corresponding parts in the different views, and in which:

Fig. 1 is a plan view of the leading end of a typical track switch showing the connection of its switch points by a front rod and a throw rod constructed in accordance with the present invention;

Fig. 2 is an elevational view shown partly in section of the track switch apparatus shown in Fig. 1;

Fig. 3 is an enlarged top plan view with parts removed of the tie rod and a switch lug bracket and their pivotal joint constructed in accordance with the present invention, and;

Fig. 4 is a side elevational view of the apparatus shown in Fig. 3.

With reference to the drawings Fig. 1 shows a typical switch layout wherein the main stock rails 11 and 12 are supported on and fastened to the tie plates 13 and ties 14 in the usual manner. The track switch is shown as having a normally closed movable switch point 15 and a normally opened movable switch point 16. These switch points 15 and 16 are hingedly connected to the main rails at their heel ends in the usual way (not shown) and rest on the tie plates 13. Switch point connecting rods are connected between these switch points 15 and 16 at intervals throughout their length to properly space them and hold them in alignment with respect to the main stock rails 11 and 12, the distance between the leading end of the open stock point 16 and the rail 12 being approximately equal to the throw of the switch throwing device (not shown) when the switch is in its open position as shown. Only two of these switch point connecting rods have been shown, the front rod FR which is connected to the very tips of the leading ends of the switch points 15 and 16 and the number one rod or main operating rod 1R which is located a short distance to the rear of the front rod FR.

The number one rod or operating rod 1R is the rod which is connected to the switch throwing device (not shown) for operating the switch points 15 and 16 and is usually connected to a fairly rigid part of the switch points. The rod 1R of the present invention comprises two identical bar members 17 of rectangular cross section which are disposed on edge and extend under the rails 11 and 12 and the switch points 15 and 16. These two bar members 17 are connected together end to end by means of a throw rod connector 18, a plate 19, and bolts 20. This connection may or may not be electrically insulated as desired. The outer end portion of each bar member 17 is provided with saw tooth serrations 21 and is connected to a tie bar 22 by means of bolts 23.

Saw tooth serrations 21 and elongated holes are provided in the tie bars 22 which cooperate with the saw tooth serrations and holes in the bar members 17 to make the connection adjustable. Pivotally connected to each tie bar 22 is a switch lug connecting bracket 24 which is disposed at approximately a right angle to the tie bar 22 so that its free end may be connected to its associated switch point 15 or 16 by means of bolts 25. These switch lug connecting brackets 24 are offset both horizontally and vertically as shown more clearly at 26 and 27 in Figs. 3 and 4, to compensate for the difference in height between the location of the switch connecting rods and the switch points. A throw rod 28 is connected between the throw rod connector 18 and the switch throwing device (not shown) to facilitate operation of the switch points from one position to the other.

The main purpose and function of the front rod FR is to provide a suitable connection which will properly space, align, and hold in an upright position the leading ends of the switch points 15 and 16. The extreme tips of these switch points are of necessity comparatively thin and approximately the same heighth as the rail with the result that there is a tendency for them to roll and turn away from the head of the rail when under the closing pressure of the switch throwing device unless they are rigidly supported.

With the switch points being individually hinged at their heel ends, the switch structure is such that when the two switch points are moved laterally back and forth from one position to the other, their leading ends and the switch point connecting rod connecting them together are subject to certain stresses because the degee of angle between them must change. Without provision being made to counteract these stresses, this would cause distortion either in the switch rod or the leading ends of the switch points with the result that the tip of the closed switch point would not properly close against the main stock rail. For this reason, it is particularly desirable to have the front rod FR connected to the switch points 15 and 16 by means of a pivotal connection which is sturdy and rigid.

The front rod FR of the present invention comprises two bar members 30 of rectangular cross section which are disposed on edge transversely to the switch points 15 and 16 and are connected together end to end by means of a connector comprising a lug plate 31, a flat plate 32 and bolts 33. This connection may or may not be an electrically insulated connection, as desired. The outer end portion of each bar member 30 is provided with saw-toothed serrations 21 and is connected to a tie bar 22 by means of bolts 23. Saw tooth serrations 21 and elongated holes are provided in the tie bars 22 which co-operate with the saw tooth serrations and holes in the bar members 30 to make the connection adjustable. Pivotally connected to each tie bar 22 is a switch lug connecting bracket 24 which is disposed at approximately a right angle to the tie bar 22, so that its free end may be connected to its associate switch point 15 or 16 by means of bolts 25. These switch lug connecting brackets 24 are offset both horizontally and vertically as shown more clearly at 26 and 27 in Figs. 3 and 4 to compensate for the difference in heighth between the location of the switch connecting rods and the switch points. The lug plate 31 is provided with a lug 34 to facilitate attachment of a point detector rod 35. This rod 35 is connected to a suitable point indicator or circuit controlling device (not shown) as desired for providing switch indications. In installations where the switch indications are not required, the rod 35 may be omitted.

From the above description and with reference to the drawing, it can be seen that the operating rod 1R and the front rod FR are constructed quite similar, the main difference being that the bar members 17 of the operating rod 1R extend under the rails 11 and 12 of the track switch for the purpose of preventing any lifting up of the switch points. Also, it should be particularly noted that the tie bars 22, the switch lug brackets 24 and their respective connecting means to the bar members 17 and 30 and the switch points 15 and 16 are all identical. Also identical in construction are the pivotal connections between the tie bars 22 and the switch lug brackets 24 which will now be described in detail.

Referring now more particularly to the enlarged views shown in Figs. 3 and 4, the tie bar 22 is provided with an enlarged head portion 40 which is forged into an arcuate shaped hook having an inner radial bearing surface 41 and an outer radial bearing surface 42. The switch lug bracket 24 also has an enlarged head portion 43 which is shaped by forging to provide a radial bearing surface 44 on one side and another radial bearing surface 45 on its opposite side. The pivotal structure also includes a resilient C shaped clamp 46 having arcuate shaped ends 47 and 48 which serve as bearing surfaces. The head portions 40 and 43 and the clamp ends 47 and 48 are heat treated to harden their bearing surfaces. These enlarged head portions 40 and 43 provide for greater bearing surfaces and more rigidity in the pivotal joint.

In assembly, the tie bar 22 and the switch lug bracket 24 are disposed in a position wherein the bearing surface 42 of the tie bar 22 and the bearing surface 44 of the switch lug bracket 24 are contacting each other, the lengthwise portions of the tie bar 22 and the switch lug bracket 24 extending in planes which are approximately at a right angle to each other. The C shaped clamp 46 is then sprung into a position wherein it clamps the tie bar 22 and the switch lug bracket 24 together, the bearing surface end 47 of the clamp 46 contacting the bearing surface 41 of the tie bar 22; whereas, the bearing surface end 48 of the clamp 46 contacts the bearing surface 45 of the switch lug bracket 24. In its unassembled condition the ends 47 and 48 of the clamp 46 are spaced apart a certain distance, which distance is less than the distance between the bearing surfaces 41 and 45 in the assembled condition of the tie bar 22 and the switch lug bracket 24. Therefore, when the clamp 46 is placed in its assembled position, its ends 47 and 48 must be sprung apart to fit over the bearing surfaces 41 and 45. Thus, in this assembled position, the ends 47 and 48 of the resilient clamp 46 have an inward bias of a predetermined force which holds the tie bar 22 and the switch lug bracket 24 together. It will be noted that at each point of contact between the various bearing surfaces the radii of one part is less than the radii of the contacting part so that the friction between the contacting surface is held to a minimum. This difference in radii also allows a change in angle with relationship to the position of the tie bar 22 and the switch lug bracket 24, which angle changes during the movement of the switch points.

A yoke is provided to hold the assembled parts in proper horizontal alignment. This yoke comprises a top plate 50 and a bottom plate 51 which are held together rather loosely by through bolts 52. These bolts 52 pass through the plates 50 and 51 and also through enlarged holes 53 in the ends 47 and 48 of the clamp 46. These enlarged holes 53 are provided to give clearance around the bolts 52 so that the resiliency of the clamp 46 is not restricted, the clamp 46 being free to expand or contract within the limits of the clearance around the bolts 52 at all times. This yoke also serves the purpose of holding the pivotal joint together rather loosely in the event that the resilient clamp 46 should become broken. The tie rod 22 and the switch lug bracket 24 could spread apart to the extent of the clearance provided by the enlarged holes 53, but the joint would still function with a certain amount of lost motion until repairs could be made.

It is believed that the switch point connection of the present invention provides a new and novel type of pivotal connection for use between a switch rod and a switch point and that it still maintains the requirements of railroad practice. The extra length of the bearing surfaces provide rigidity and also has a tendency to reduce wear as the nature of the structure cuts friction to a minimum and distributes contact over a larger area. The resilient C clamp provides the necessary holding pressure and there is no lost motion even though there may be in time wear on the bearing surfaces or there may be a slight inaccuracy in manufacture. The various bearing surfaces can all be forged in manufacture and if necessary, may be smoothed by polishing or grinding, but costly machine work is practically abolished. Furthermore, the various parts of the assembly are uniform for each pivotal joint which fact tends to cut costs in manufacture, maintenance, and stock piling.

Having thus described a means for connecting the points of a track switch as one specific embodiment of the present invention, it is desired to be understood that this form is selected to facilitate in the disclosure of the invention rather than to limit the number of forms which the invention may assume. It is to be further under-

What I claim is:

1. A joint for pivotally connecting together two members, a first member having a head portion formed in the shape of an arcuate hook and having an inner radial bearing surface and an outer radial bearing surface, a second member having a straight head portion with a radial bearing surface on opposite sides thereof, a resilient C shaped clamp having its two ends arcuate shaped with transverse holes therethrough, said clamp receiving and holding said two members together under biasing pressure when assembled with the outer radial bearing surface of said first member contacting one of the radial bearing surfaces of said second member, said outer radial bearing surface of said first member having a radius slightly larger than the radius of said one radial bearing surface of said second member, one end of said clamp contacting the inner radial bearing surface of said first member and the other end of said clamp contacting the other radial bearing surface of said second member, and a yoke comprising two plates, one on each side of said clamp, and two bolts, said bolts passing through said transverse holes in said clamp to thereby maintain the parts of said joint in proper horizontal alignment.

2. A connecting means for pivotally connecting and adjustably spacing two switch points of a railway track switch comprising, a switch rod of substantially rectangular cross section disposed on edge between said switch points, two switch lug brackets of substantially rectangular cross section disposed substantially at right angles to said switch rod and parallel to said switch points, a flexible pivotal connection at each end of said switch rod to one end of a corresponding cooperating said switch lug bracket, each of the other ends of said switch lugs being connected to its cooperating switch points, said switch rod comprising two bars connected together end to end by a connector and having transverse holes and saw tooth serrations therein at their other ends to facilitate adjustable connections to tie bars, said tie bars having elongated transverse holes and saw tooth serrations therein at one end for cooperation with said switch rod and having a hook shaped head portion at their other ends for cooperation with a straight head portion on said switch lug brackets, the head portions of each of said tie bars and said switch lug brackets having radial bearing surfaces on opposite sides thereof, each of said pivotal connections comprising an assembly consisting of two of said radial bearing surfaces cooperating with each other and the other two of said radial bearing surfaces cooperating with the arcuate shaped ends of a resilient C shaped clamp, said clamp holding said tie bar and switch lug bracket together under biasing pressure, said radial bearing surface on each switch lug having a slightly larger radius than that tie bar radial bearing surface with which it cooperates, a yoke comprising a top plate and a bottom plate having bolts passing therethrough and through the ends of said clamp for maintaining the elements of said pivotal connection in proper horizontal alignment; and an operating rod attached to said switch rod connector to facilitate operation of said switch points.

3. A joint for pivotally connecting together two members, a first member having one end portion in the shape of a hook with inner and outer radial bearing surfaces, a second member having a head portion with a radial bearing surface on one side cooperating with the outer radial bearing surface of said hooked portion of said first member and having a radii slightly larger than said outer radial bearing surface of said hooked portion, said head portion of said second member having on its other side a radial bearing surface of substantially the same radii as the inner bearing surface of said hooked portion of said first member, a resilient clamp of C-shape having open jaws for receiving the hooked end portion of said first member and the head portion of said second member and biasing them toward each other by providing pressure against the inner radial bearing surface of said hooked portion and the radial bearing surface on said other side of said head portion of said second member, and yoke plates located to enclose the jaws of said clamp on the outer sides thereof said plates being secured to said jaws to maintain proper alignment of the hooked end portion of said first member with the head portion of said second member within the jaws of said clamp.

4. In combination with a pair of movable switch points, a switch lug for each switch point having one end connected to its respective switch point and having inside and outside radial bearing surfaces on opposite sides of its other end, a switch rod extending between said switch lugs, said switch rod having an arcuate hook at each end with inside and outside radial bearing surfaces, said outer radial bearing surface at each end having a smaller radius than the radius of the adjacent inside radial bearing surface of the corresponding switch lug for that end and with which it cooperates, and a clamp for each end of said switch rod holding said cooperating radial bearing surfaces together, each said clamp having two bearing bolts, one for said inside radial bearing surface of said switch rod and the other for said outside radial bearing surface of the respective switch lug.

References Cited in the file of this patent

UNITED STATES PATENTS

| | | |
|---|---|---|
| D. 133,698 | Eubanks | Sept. 8, 1942 |
| 380,836 | Warfield | Apr. 10, 1888 |
| 2,099,559 | Eastburn et al. | Nov. 16, 1937 |
| 2,316,312 | Bone | Apr. 13, 1943 |
| 2,379,406 | Alvis | July 3, 1945 |
| 2,404,775 | Ehmann | July 30, 1946 |